US012693976B2

(12) United States Patent
Benedict et al.

(10) Patent No.: US 12,693,976 B2
(45) Date of Patent: Jul. 28, 2026

(54) CACHING DATA OF MEMORY ROWS

(71) Applicant: HEWLETT PACKARD ENTERPRISE DEVELOPMENT LP, Spring, TX (US)

(72) Inventors: Melvin K. Benedict, Magnolia, TX (US); Eric L. Pope, Tomball, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/784,267

(22) Filed: Jul. 25, 2024

(65) Prior Publication Data

US 2026/0030162 A1    Jan. 29, 2026

(51) Int. Cl.
G06F 12/0802    (2016.01)

(52) U.S. Cl.
CPC ...... G06F 12/0802 (2013.01); G06F 2212/60 (2013.01)

(58) Field of Classification Search
CPC ............. G06F 12/0802; G06F 2212/60; G06F 12/023; G06F 12/0646; G06F 12/0868; G06F 12/14; G06F 12/1425
See application file for complete search history.

(56) References Cited

U.S. PATENT DOCUMENTS

| | | | |
|---|---|---|---|
| 10,261,852 | B2 | 4/2019 | Benedict et al. |
| 10,373,667 | B2 | 8/2019 | Benedict et al. |
| 10,636,476 | B2 | 4/2020 | Nale |
| 11,474,706 | B2 | 10/2022 | Benedict et al. |
| 2001/0037433 | A1* | 11/2001 | Dempsey ............. G06F 12/123 |
| | | | 711/E12.04 |
| 2016/0077751 | A1 | 3/2016 | Benedict |
| 2016/0202926 | A1 | 7/2016 | Benedict |
| 2022/0115057 | A1 | 4/2022 | Pope et al. |
| 2022/0199144 | A1* | 6/2022 | Roberts ............... G11C 11/4078 |
| 2022/0284944 | A1 | 9/2022 | Benedict et al. |
| 2023/0047007 | A1* | 2/2023 | Lovett ............... G11C 11/40615 |
| 2023/0236739 | A1* | 7/2023 | Gieske .................. G06F 3/0673 |
| | | | 711/105 |
| 2023/0236968 | A1* | 7/2023 | Gieske ................ G06F 12/0802 |
| | | | 711/118 |
| 2023/0236982 | A1* | 7/2023 | Thirumala .......... G11C 11/4063 |
| | | | 711/128 |
| 2024/0069757 | A1* | 2/2024 | Ko ......................... G06F 3/0623 |
| 2024/0119985 | A1 | 4/2024 | Benedict et al. |

OTHER PUBLICATIONS

Wikipedia, Isolation Amplifier last edited on Feb. 12, 2022 (5 pages).
Wikipedia, Op amp integrator last edited on Sep. 5, 2022 (5 pages).

* cited by examiner

*Primary Examiner* — Michael Krofcheck
(74) *Attorney, Agent, or Firm* — Trop, Pruner & Hu, P.C.

(57) ABSTRACT

In some examples, a memory controller includes a cache and an interface to a communication channel that is connected to a memory module. The memory controller receives an alert based on a counter in the memory module breaching a threshold, where the counter is associated with a row of memory cells in the memory module, and the alert indicates a frequent activation of the row of memory cells. Based on the alert, the memory controller stores, in the cache, data stored in the row of memory cell.

20 Claims, 4 Drawing Sheets

CACHING DATA OF MEMORY ROWS

BACKGROUND

A memory device includes memory cells to store data. Each memory cell includes a data storage structure to store data. In some examples, the data storage structure of a memory cell can include a storage capacitor. In other examples, data storage structures of memory cells can include floating gates that trap electrical charge to represent data, resistive elements that represent data as a resistance, and so forth.

BRIEF DESCRIPTION OF THE DRAWINGS

Some implementations of the present disclosure are described with respect to the following figures.

Figure 1:
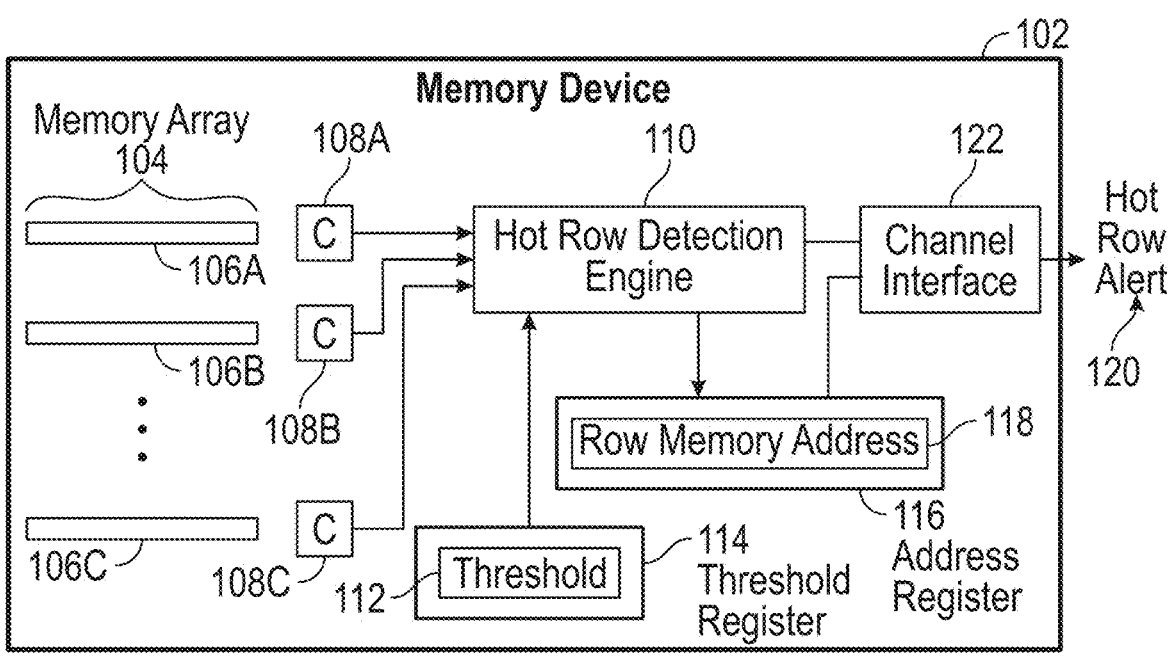
FIG. 1 is a block diagram of a memory device according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Memory cells of a memory device may be arranged as rows and columns of memory cells. Each row of memory cells can be activated in response to activation of a row signal line (also referred to as a word line). In an activated row of memory cells, column select signals can be used to select a number of column data lines (a single column data line or multiple column data lines) to access (read or write). As used here, a "row" of memory cells can refer to any collection of memory cells that is to be activated together in response to an activation signal.

During operations of an electronic device, certain rows of a memory device may be activated more frequently than other rows. Frequent activations of a row of a memory device may be associated with various issues. First, the frequent activations of a row of memory cells may produce a type of disturbance referred to as a row hammer, in which the repeated activations of the row of memory cells cause data errors in memory cells of neighboring rows in the memory device. Second, if a row of memory cells is accessed frequently, such as by entities including programs and hardware components in the electronic device, then performance may suffer since memory access operations over a memory bus to the memory device have an access latency.

In accordance with some implementations of the present disclosure, data in a row of memory cells in a memory device that has been activated for greater than a threshold number of times in a given time interval may be stored in a cache of a memory controller. By caching the data of the frequently activated row of memory cells, a request for data in the row of memory cells can be satisfied using the cache of the memory controller, which has the following benefits. First, activation of the row of memory cells does not have to occur to obtain data for the request, which reduces the likelihood of a row hammer disturbance. Further, data access performance can be improved when responding to the request by retrieving data from the cache of the memory controller since the access latency of the cache is lower than the access latency of the memory device. Further, a memory address of a frequently activated row of memory cells can be provided to an operating system (OS) memory manager to allow the OS memory manager to reallocate (remap) memory regions so that frequent activation of the row of memory cells would be less likely in subsequent electronic device operations.

FIG. 1 is a block diagram of a memory device 102 according to some examples. An example type of the memory device 102 includes a dynamic random access memory (DRAM) device. A DRAM device has memory cells that each include a storage capacitor and an access transistor connected to the storage capacitor. Although the ensuing discussion refers to DRAM devices, it is noted that techniques or mechanisms according to some implementations of the present disclosure can be applied with other types of memory devices, such as memory devices that store data using floating gates (e.g., flash memory devices, electrically erasable and programmable read-only memory devices, etc.), memory devices that store data using resistive memory elements (e.g., resistive memory devices), and so forth.

The memory device 102 includes a memory array 104 that includes rows and columns of memory cells. FIG. 1 shows rows 106A, 106B, and 106C of memory cells. Although three rows are depicted, the memory array 104 can include a different quantity of rows. A row of memory cells can refer to any collection of memory cells that is to be activated together in response to an activation signal. The activation signal can also be referred to as a row signal line or a word line. When a given row signal line is activated, the memory cells of the given row are connected, such as through pass transistors, to corresponding column data lines to enable access of the memory cells of the given row. In an activated row of memory cells, column select signals can be used to select a number of column data lines (a single column data line or multiple column data lines) to access (read or write).

The rows of the memory array 104 are associated with respective counters. For example, the row 106A is associated with a counter 108A, the row 106B is associated with a counter 108B, and the row 106C is associated with a counter 108C. Although FIG. 1 shows one counter associated with each row, in other examples, multiple counters may be associated with a row.

Each counter of the counters 108A, 108B, and 108C is to count a quantity of activations of a respective row. An activation of a row occurs when a row signal line for the row is activated, which can refer either to asserting the row signal line to a high state or a low state. Note that a counter counts a quantity of activations of a given row, and does not count a quantity of accesses of the row. When the given row is activated, the memory cells of the given row can be accessed zero or more times. The activation of the given row causes the counter to advance by 1. Once activated, any subsequent accesses of the activated row (based on activating column select lines) would not cause the counter to advance. Advancing the counter can refer to incrementing the counter, which can be initialized to an initial low value (e.g., 0 or some other low value). Alternatively, advancing a counter can refer to decrementing the counter, which can be initialized to an initial high value (e.g., a maximum value of the counter or another high value).

A counter can be implemented as either a digital counter or an analog counter. A digital counter has logic that stores a number of bits that collectively represents a count of the counter. An analog counter can be implemented using an arrangement of analog circuitry, including an operational amplifier, one or more resistors, and one or more capacitors, which collectively can implement an integrator that integrates an input voltage over time.

In accordance with some examples of the present disclosure, the counters 108A, 108B, and 108C can be used by a hot row detection engine 110. The hot row detection engine 110 is used to detect "hot" rows. A "hot" row can refer to a row that has been activated at least a specified quantity of times per unit time, where this specified quantity of activations per unit time is represented by a hot row threshold 112 stored in a threshold register 114. More specifically, if the count in a particular counter 108A, 108B, or 108C breaches the hot row threshold 112, then the hot row detection engine 110 can indicate that the respective row 106A, 106B, or 106C is a hot row. The count of a counter "breaching" a threshold can refer to the counter exceeding the threshold if the counter is an incrementing counter. Alternatively, the count of a counter "breaching" a threshold can refer to the counter falling below the threshold if the counter is a decrementing counter.

In some examples, the counters 108A, 108B, and 108C are counters used by a row hammer disturbance mitigation engine (not shown) of the memory device. In other examples, the counters 108A, 108B, and 108C used by the hot row detection engine 110 are separate from counters used by the row hammer disturbance mitigation engine. In yet further examples, the memory device 102 does not include the row hammer disturbance mitigation engine, since actions taken in response to hot row detections by the hot row detection engine 110 may be sufficient to avoid row hammer disturbances.

A row hammer refers to a type of disturbance that occurs when a row of memory cells (such as those of a DRAM device) is activated repeatedly within a time interval (e.g., a refresh interval of the DRAM device), which can cause data errors in memory cells of neighboring rows. For example, the disturbance can cause the memory cells of neighboring rows to leak charge at a faster rate than expected. In further examples, electrical or magnetic interference to the neighboring rows caused by a large quantity of accesses of a given row of memory cells may even flip the state of data bits in memory cells of the neighboring rows. The row hammer disturbance mitigation engine can detect the row hammer disturbance based on detecting a counter of a row breaching a row hammer threshold (e.g., exceeding the row hammer threshold if the counter is incremented). In response to detecting the row hammer disturbance, the row hammer disturbance mitigation engine can trigger a memory refresh of a subset of the memory array 104. A memory refresh involves reading data bits from the memory cells of the subset, and rewriting the data bits without modification back to the memory cells of the subset to preserve the data bits.

In some examples, the hot row threshold 112 can be set lower than the row hammer threshold. Thus, a hot row can be a row that is on its way to causing a row hammer disturbance, but has not yet breached the row hammer threshold. In other examples, the hot row threshold can be set equal to the row hammer threshold. In some examples, the hot row threshold 112 in the threshold register 114 can be dynamically adjusted, such as by a memory controller or another entity within an electronic device.

The ensuing discussion assumes that a counter for a row is incremented with activations of the row. In other examples, a counter for a row can be decremented with activations of the row.

The memory device 102 also includes an address register 116 that can be used to store a row memory address 118 of a hot row detected by the hot row detection engine 110. In response to detecting the hot row, the hot row detection engine 110 can write the row memory address 118 of the hot row to the address register 116. More specifically, in examples where there is one counter per row of memory cells, when a counter for a given row breaches the hot row threshold, the address of the counter provides the row memory address that can be captured in the address register 116.

A specific memory cell of the memory array 104 can be accessed with a memory address, which includes a row address portion and a column address portion. The row address portion is used to select one of the rows 106A, 106B, and 106C to activate, and a column address portion is used to select a column within the activated row. The row memory address 118 stored in the address register 116 includes the row address portion of a memory address.

Although FIG. 1 shows the address register 116 storing one row memory address 118, in other examples, the address register 116 can store multiple row memory addresses for respective hot rows that have been detected by the hot row detection engine 110.

The registers 114 and 116 may be separate registers, or the registers 114 and 116 may be different sections of the same register. A register can be implemented using any storage element in the memory device 102, including a portion of the memory array 104, a latch, or any other storage element.

In response to detecting a hot row, the hot row detection engine 110 can issue a hot row alert 120 that is sent to a memory controller through a channel interface 122 of the memory device 102. The channel interface 122 includes a signal transceiver to transmit and receive signals. The hot row alert 120 can be in the form of an alert signal that can be activated (asserted to a high or low state) or deactivated (de-asserted to a low or high state).

Figure 2:
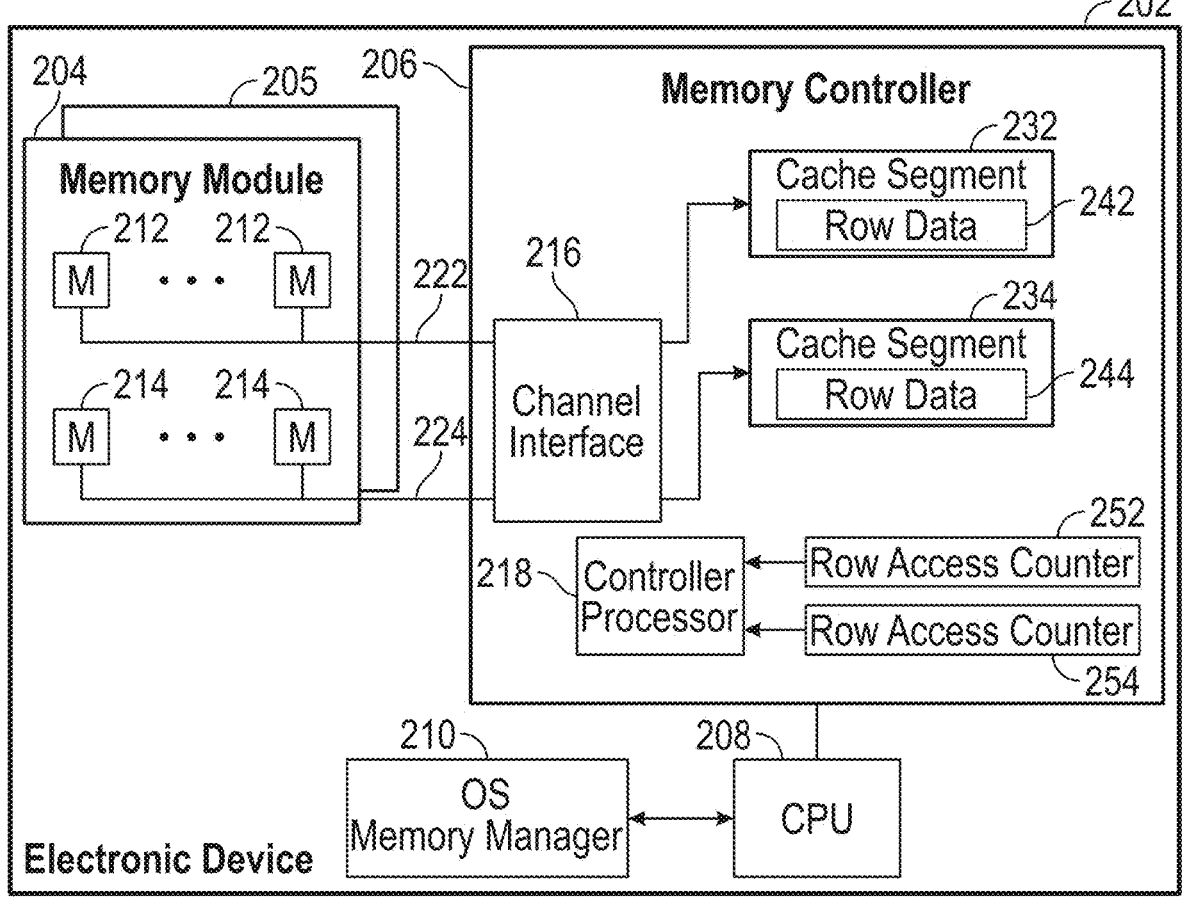
FIG. 2 is a block diagram of an electronic device according to some examples.

FIG. 2 is a block diagram of an electronic device 202, which includes one or more memory modules (e.g., 204 and 205), a memory controller 206, a central processing unit (CPU) 208, and an operating system (OS) memory manager 210 executed by the CPU 208. Although two memory modules are shown in FIG. 2, in other examples, the electronic device 202 can include just one memory module or more than two memory modules.

In accordance with some examples of the present disclosure, the memory controller 206 can perform the following in response to a hot row alert (e.g., 120 in FIG. 1): (1) locally cache the corresponding hot row data, and (2) notifying the CPU 208 of the hot row so that the OS memory manager 210 can take responsive action based on a policy applied by the OS memory manager 210.

In some examples, the memory controller 206 and the CPU 208 can be included in the same integrated circuit device. In other examples, the CPU 208 and the memory controller 206 may be part of different integrated circuit devices.

The memory controller 206 manages the access (read and write) of each memory module 204 or 205. In some examples, a memory module can include a dual in-line memory module (DIMM) or another type of memory module that includes memory devices. More generally, a "memory module" can refer to either a module with multiple memory devices, or to an individual memory device.

In the example of FIG. 2, the memory module 204 includes a number of memory devices 212 and 214. Each of the memory devices 212 and 214 can be the memory device 102 of FIG. 1. The memory module 205 if present may have a similar arrangement of memory devices. The ensuing discussion refers to the memory module 204. The described mechanisms or techniques for the memory module 204 apply also to the memory module 205.

The memory devices 212 form a first set of memory devices in the memory module 204, and the memory devices 214 form a second set of memory devices in the memory module 204. Although just two sets of memory devices are shown in FIG. 2, in other examples, more than two sets of memory devices may be included in the memory module 204. In further examples, the memory module 204 may include just one set of memory devices. A "set" of memory devices can include a single memory device or multiple memory devices.

The first set of memory devices 212 is connected over a first communication channel 222 to the memory controller 206, and the second set of memory devices 214 is connected over a second communication channel 224 to the memory controller 206. A "communication channel" can refer to any type of interconnect, such as a memory bus, a Compute Express Link (CXL) interconnect, or any other type of communication link. The memory controller 206 is able to access one memory device at a time over a communication channel.

The memory controller 206 includes a channel interface 216 that is connected to the communication channels 222 and 224. The channel interface 216 includes a signal transceiver to transmit and receive signals over a communication channel. The memory controller 206 also includes cache segments 232 and 234 to locally cache, in the memory controller 206, respective row data 242 and 244 of respective rows in the memory module 204. Each cache segment 232 or 234 can store data of one or more hot rows of the memory module 204.

In some examples, the hot row data 242 can be stored in a cache line of the cache segment 232, and the hot row data 244 can be stored in a cache line of the cache segment 234. A cache line of a cache segment is made up of a specified quantity of bits of a cache. In examples where a cache segment can store data of multiple hot rows, then the cache segment has multiple cache lines to store the data of the multiple hot rows.

The cache segments 232 and 234 can be implemented as part of one cache, or alternatively, the cache segments 232 and 234 can be implemented with separate caches. In some examples, there is one cache per communication channel, such that if there are multiple communication channels to a memory module, multiple caches will be provided in the memory controller 206 for the memory module. In other examples, there is one cache per memory controller, and this cache is used to store row data of different sets of memory devices connected over different communication channels. In yet further examples, there is one cache per memory module so that multiple caches are included in the memory controller if there are multiple memory modules.

More generally, a "cache segment" can refer to either an entire cache or a portion of a cache. A cache is implemented using one or more memory devices, such as static random access memory (SRAM) devices, a DRAM devices, or other types of memory devices.

The memory controller 206 includes a controller processor 218 that performs specified functionalities of the memory controller 206. For example, the controller processor 218 can cache row data into a respective cache segment in response to a hot row alert (e.g., 120 in FIG. 1) from a memory device indicating that a hot row has been detected. In response to the hot row alert, the controller processor 218 is able to access an address register (e.g., 116 in FIG. 1) of the memory device in which the hot row was detected, to determine the row memory address of the hot row. The controller processor 218 then causes the memory controller 206 to retrieve the data of the hot row identified by the row memory address, and store the retrieved hot row data in a corresponding cache segment. Note that the hot row data that is cached can include the data of the entire row or a portion of the data of the entire row.

In some examples, once the hot row data of a first hot row is stored in a cache line of a cache segment, the hot row data of the first hot row can be kept in the cache line until the controller processor 218 determines that the hot row data of the first hot row in the cache line is to be replaced with hot row data of a second hot row (e.g., a hot row that was more recently detected than the first hot row).

In other examples, the controller processor 218 can proactively invalidate a cache line in the cache segment based on detecting inactivity of a hot row. The invalidated cache line can be used to store other hot row data in response to another hot row alert. In an example, the controller processor 218 can include row access counters 252 and 254. The row access counter 252 is used to track a quantity of row accesses of the hot row data 242 within a specified time interval, and the row access counter 254 is used to count the number of accesses of the hot row data 244 within the specified time interval. For example, the row access counter 252 is incremented with each access of the hot row data 242, and the row access counter 254 is incremented with each access of the hot row data 244. An access of a given hot row data (242 or 244) occurs when a request for data is received by the memory controller 206 and the controller processor 218 determines that the data for the request can be satisfied using the given hot row data cached in a cache segment.

A row access counter is reset upon expiration of the specified time interval, and the counting can begin again for next specified time interval. If a count of the number of accesses of the given hot row data over the specified time interval falls below an inactivity threshold, then that indicates that the given hot row data has become inactive, and the controller processor 218 can invalidate the cache line of the cache segment storing the given hot row data. The activity threshold can be a value stored in a register of the memory controller 206. Invalidating a cache line can be accomplished by setting an invalidity flag of the cache line to an active state (high state or low state).

In some cases, the given hot row data cached in the cache line may have been modified due to write operations. The modification of the given hot row data may have been made in response to write requests without making the corresponding modification of the data in the respective hot row in the memory module 204. In such examples, in conjunction with invalidating the cache line, the modified hot row data is also flushed (written back) to the respective hot row in the memory module 204. Note that as long as the given hot row data in the cache line has not become inactive (e.g., the number of accesses of the given hot row data over the specified time interval has not fallen below the inactivity threshold), then the controller processor 218 would keep the given hot row data (even if modified) in the cache line.

The CPU 208 of the electronic device 202 executes primary machine-readable instructions of the electronic device 202. The primary machine-readable instructions include system firmware (e.g., Basic Input/Output System (BIOS) code), an OS, an application program, or other machine-readable instructions that perform general tasks of the electronic device 202. The OS of the electronic device 202 includes the OS memory manager 210 that manages the allocation of memory regions in the memory module(s) to store data for entities that are allowed to store data in the memory module(s).

The controller processor 218 of the memory controller 206 can also notify the CPU 208 of a hot row to cause the OS memory manager 210 to perform a reallocation (remapping) of memory regions to spread data around so reduce the likelihood of activation of the hot row in subsequent data access operations from an entity in the electronic device 202.

Figure 3:
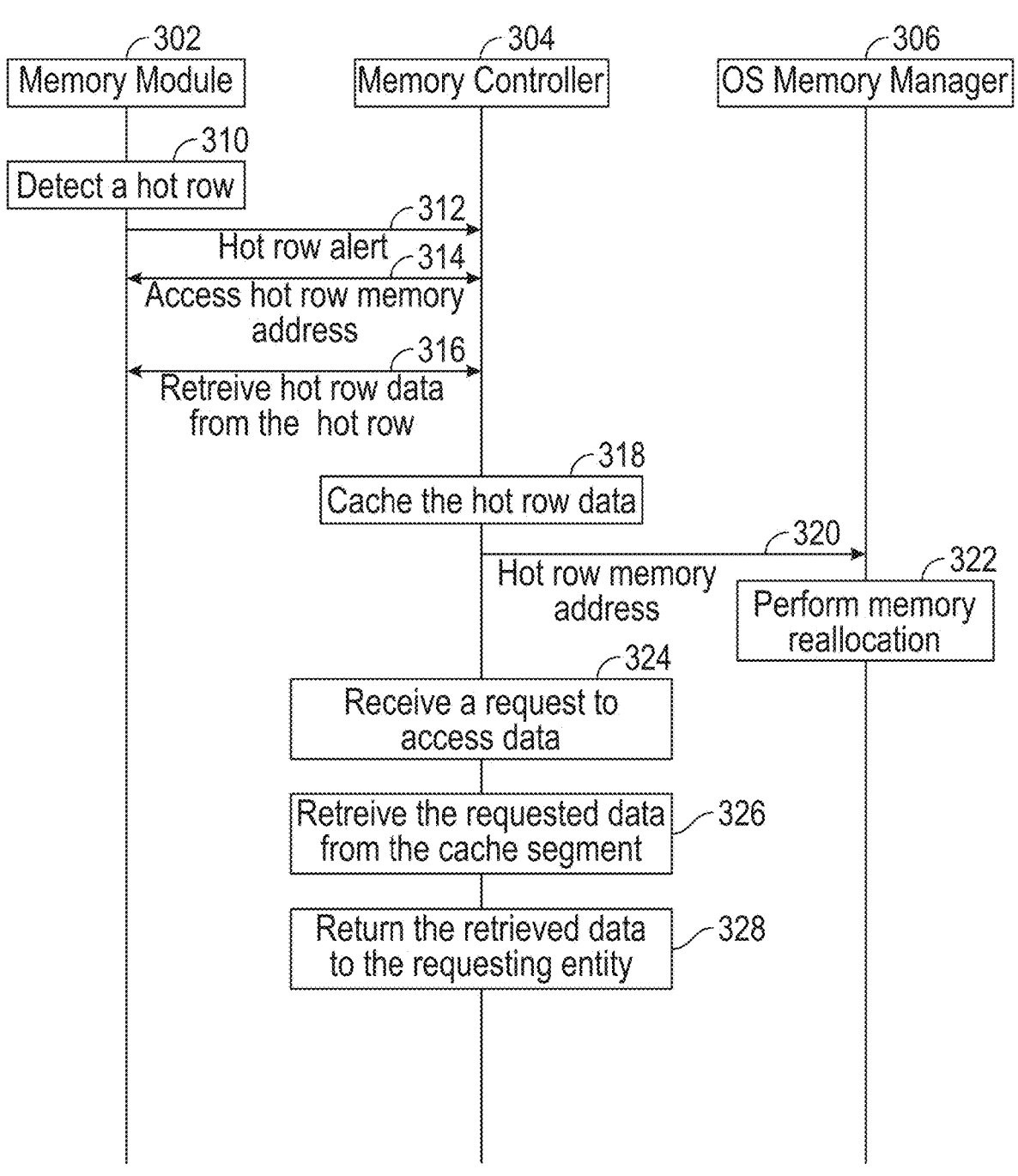
FIG. 3 is a flow diagram of a process of a memory module, a memory controller, and an operating system (OS) memory manager, according to some examples.

FIG. 3 is a flow diagram of a process performed by a memory module 302, a memory controller 304, and a OS memory manager 306. The memory modules 302 can be one of the memory modules 204 and 205 of FIG. 2, the memory controller 304 can be the memory controller 206 of FIG. 2, and the OS memory manager 306 can be the OS memory manager 210 of FIG. 2.

FIG. 3 shows tasks executed in a particular order. In other examples, the tasks may be executed in a different order, some of the tasks may be omitted, and other tasks may be added. In the ensuing discussion, a "memory module" performing various actions can refer to a memory device within the memory module performing various actions.

The memory module 302 detects (at 310) a hot memory row. For example, a hot row detection engine (e.g., 110 in FIG. 1) compares a count of a counter (any of the counters 108A, 108B, 108C in FIG. 1) to the hot row threshold 112, and if the count exceeds the hot row threshold 112, the hot row detection engine makes a determination that the row associated with the counter is a hot row.

The memory module 302 sends (at 312) a hot row alert (e.g., 120 in FIG. 1) to the memory controller 304. In response to the hot row alert, the memory controller 304 accesses (at 314) an address register (e.g., 116 in FIG. 1) in the memory module 302 to retrieve the row memory address (e.g., 118 in FIG. 1) of the hot row from the address register.

Based on the retrieved hot row memory address, the memory controller 304 retrieves (at 316) hot row data of the hot row from the memory module 302, and caches (at 318) the hot row data in a cache segment (e.g., 232 or 234 in FIG. 2) of the memory controller.

In some examples, the memory controller 304 can also send (at 320) the hot row memory address to the OS memory manager 306. In response to the hot row memory address, the OS memory manager 308 can perform a memory reallocation (at 322) to spread data to different memory regions. For example, prior to the memory reallocation, data of a given entity may be stored in a first collection of memory regions (a single memory region or multiple memory regions). A "memory region" includes a portion of memory arrays in the memory module 302. The memory reallocation can cause data in the first collection of memory regions to be moved to other memory regions. The memory reallocation may reduce the likelihood of further activations of a hot row due to memory access operations by one or more entities in an electronic device.

After caching the hot row data, the memory controller 206 receives (at 324), from a requesting entity, a request to access (read or write) data of the hot row for which the hot row data has been cached in the cache segment of the memory controller 304. In response to the request, the memory controller 304 retrieves (at 322) the requested data from the cache segment and returns (at 324) the retrieved data to the requesting entity.

By caching hot row data of hot rows in a cache of a memory controller, the likelihood of row hammer disturbances in a memory module can be reduced if the hot rows do not have to be accessed because the hot row data is cached at the memory controller. In addition, if a data access request can be satisfied from the cache of the memory controller, then data access latency can be reduced since the memory controller does not have to perform a data access operation over a communication channel to the memory module. Further, the memory controller can notify an OS memory manager of hot rows so that the OS memory manager can take action (e.g., by performing a memory reallocation) to reduce the likelihood that such hot rows will be activated in subsequent data access operations.

Caching hot row data of N ($N \geq 1$) rows of a memory module can help mitigate an N-way hammer attack. For example, caching hot row data of 3 rows of the memory module can help protect against a 3-way hammer attack that is repeatedly activating 2 rows of the memory module.

Figure 4:
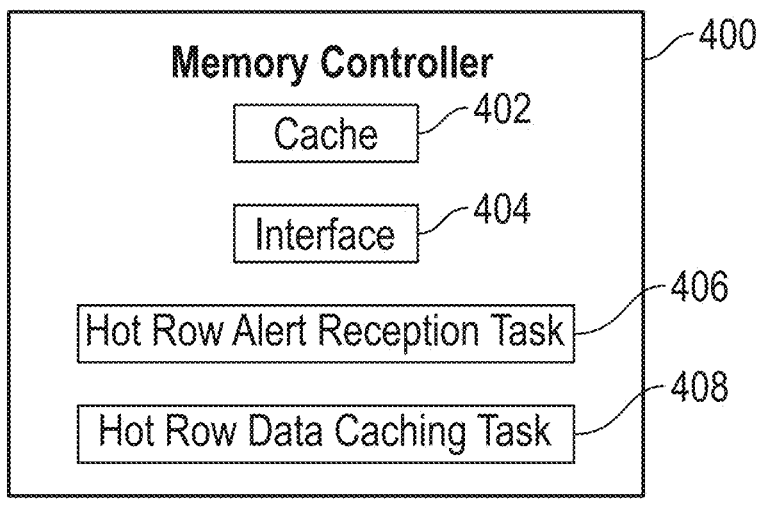
FIG. 4 is a block diagram of a memory controller according to some examples.

FIG. 4 is a block diagram of a memory controller 400 according to some examples of the present disclosure. The memory controller 206 of FIG. 2 is an example of the memory controller 400.

The memory controller 400 includes a cache 402 and an interface 404 to a communication channel that is connected to a memory module. An example of the interface 404 is the channel interface 216 of FIG. 2.

The memory controller 400 is configured to perform various tasks, which may be performed by a controller processor (e.g., 218 in FIG. 2) of the memory controller 400. The tasks include a hot row alert reception task 406 to receive an alert based on a counter in the memory module breaching a threshold. The counter associated with a row of memory cells in the memory module, and the alert indicates a frequent activation of the row of memory cells. The alert can be in the form of an alert signal on the communication channel.

The counter breaching the threshold refers to either (1) a count of the counter exceeding (being greater than or greater than or equal) the threshold (in examples where the counter increments), or (2) a count of the counter falling below (being less than or less than or equal) the threshold (in examples where the counter decrements).

The tasks of the memory controller 400 further include a hot row data caching task 408 to, based on the alert, store, in the cache 402, data stored in the row of memory cells. The data is retrieved by the memory controller 400 from the row of memory cells, and stored in a cache line of the cache 402.

In some examples, in response to a request to access the row of memory cells, the memory controller 400 retrieves responsive data from the cache 402 without activating the row of memory cells in the memory module.

In some examples, based on the alert, the memory controller 400 accesses the memory module to determine a memory address of the row of memory cells. For example, the memory address can be retrieved from a register of the memory module.

In some examples, the memory controller 400 provides the memory address to an OS memory manager (e.g., 210 in FIG. 2 or 306 in FIG. 3) for a reallocation of memory regions spread data of the row of memory cells to different memory region(s), to mitigate the frequent activation of the row of memory cells.

In some examples, the threshold is stored in a register of the memory module.

In some examples, the memory controller 400 can program the threshold in the register of the memory module, to dynamically adjust the threshold.

In some examples, the cache is to store data of N rows of memory cells in the memory module, where N is greater than or equal to 1.

In some examples, after storing the data of the row of memory cells in a cache line of the cache, the memory controller 400 monitors a frequency of access of the data in the cache line, and based on the monitored frequency satisfying an inactivity threshold, the memory controller 400 invalidates the cache line containing the data of the row of memory cells. For example, the memory controller 400 includes a row access counter (e.g., 252 or 254 in FIG. 2) to count a quantity of accesses of the data in the cache line, where the monitoring of the frequency of access is based on the count of the row access counter. The count of the row access counter satisfies the inactivity threshold if either (1) the count falls below the inactivity threshold (in examples where the access counter increments, or (2) the count exceeds the inactivity threshold (in examples where the access counter decrements).

Figure 5:
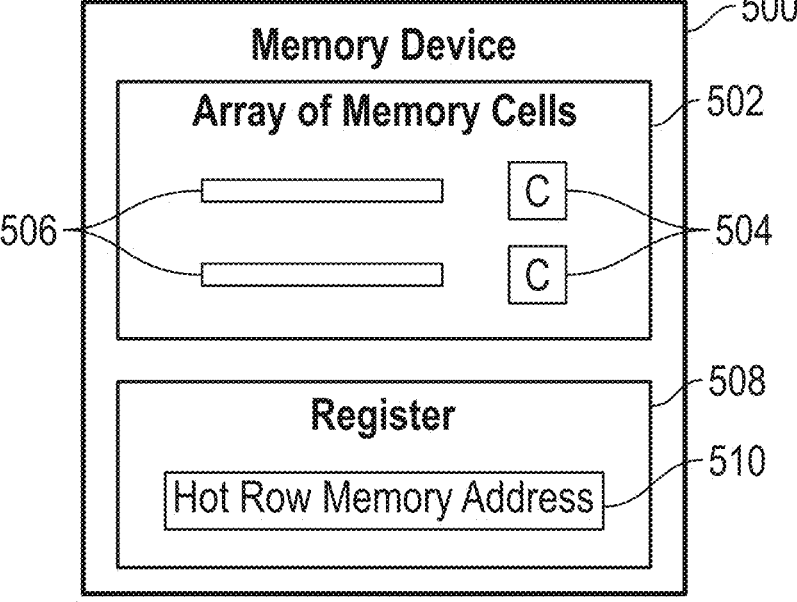
FIG. 5 is a block diagram of a memory device according to some examples.

FIG. 5 is a block diagram of a memory device 500 according to some examples of the present disclosure. The memory device 102 of FIG. 1 is an example of the memory device 500.

The memory device 500 includes an array of memory cells 502, and a plurality of counters 504 to track activations of respective rows 506 of memory cells in the array of memory cells 502. The memory device 500 further includes a register 508 to store a hot row memory address 510 of a given row of the rows of memory cells responsive to a count of a given counter (one of the counters 504) associated with the given row breaching a threshold. The threshold can be the hot row threshold 112 stored in the threshold register 114 of FIG. 1, for example.

In some examples, the memory device 500 sends an alert to a memory controller responsive to the count of the given counter breaching the threshold.

In some examples, the register 508 is accessible by the memory controller for the memory controller to determine the address of the given row of memory cells.

Figure 6:
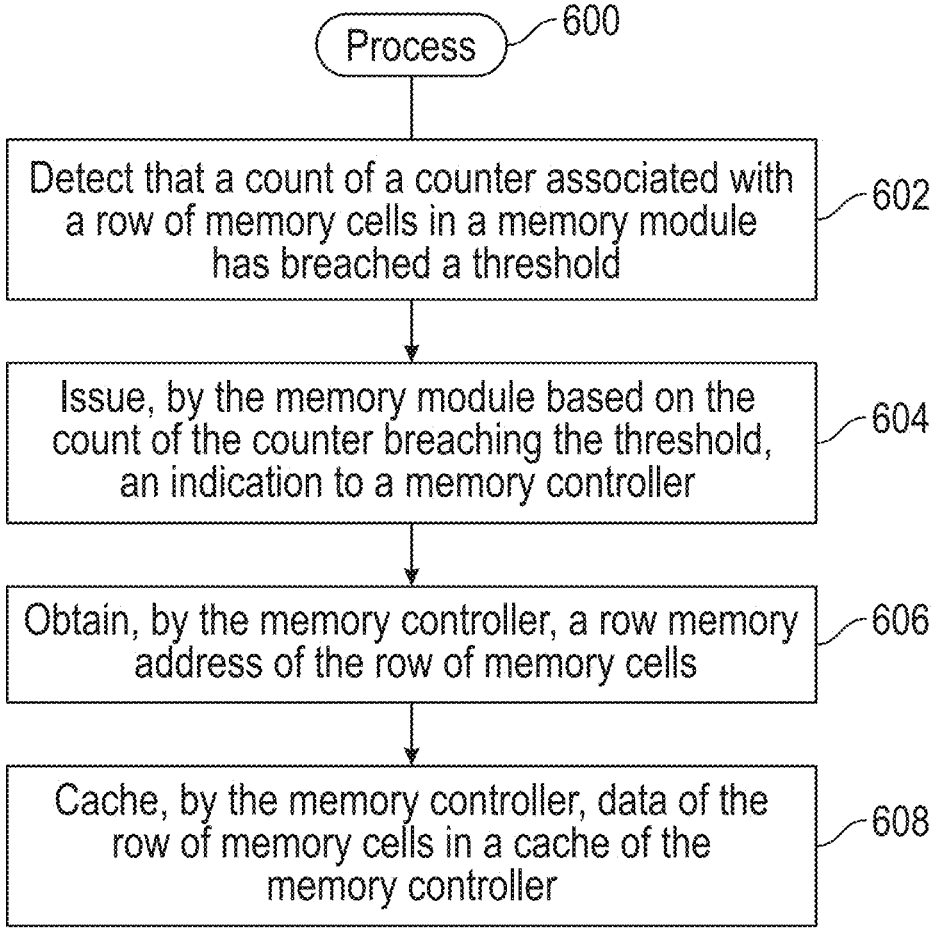
FIG. 6 is a flow diagram of a process according to some examples.

FIG. 6 is a flow diagram of a process 600 according to some examples of the present disclosure. The process 600 can be performed by an electronic device, such as the electronic device 202 of FIG. 2.

The process 600 includes detecting (at 602) that a count of a counter associated with a row of memory cells in a memory module has breached a threshold. The counter is included in the memory module.

The process 600 includes issuing (at 604), by the memory module based on the count of the counter breaching the threshold, an indication to a memory controller. The indication can include a hot row alert (e.g., 120 in FIG. 1).

The process 600 includes obtaining (at 606), by the memory controller, a row memory address of the row of memory cells. The row memory address may be retrieved by the memory controller from a register in the memory module.

The process 600 includes caching (at 608), by the memory controller, data of the row of memory cells in a cache of the memory controller. The cached data can be used to satisfy access requests of the row of memory cells.

As used here, an "engine" can refer to one or more hardware processing circuits, which can include any or some combination of a state machine, a microprocessor, a core of a multi-core microprocessor, a microcontroller, a programmable integrated circuit, a programmable gate array, or another hardware processing circuit. Alternatively, an "engine" can refer to a combination of one or more hardware processing circuits and machine-readable instructions (software and/or firmware) executable on the one or more hardware processing circuits.

A "processor" can include a microprocessor, a core of a multi-core microprocessor, a microcontroller, a programmable integrated circuit, a programmable gate array, or another hardware processing circuit.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A memory controller comprising:
   a cache; and
   an interface to a communication channel that is connected to a memory module,
   the memory controller to:
     receive, at the memory controller over the communication channel, an alert based on a counter in the memory module breaching a threshold, the counter associated with a row of memory cells in the memory module, and the alert indicating a frequent activation of the row of memory cells; and
     based on the alert;
     access, over the communication channel, a register of the memory module to determine a memory address of the row of memory cells, and
     retrieve, from the memory module, data of the row of memory cells identified by the memory address from the register; and
     store the retrieved data in the cache.

2. The memory controller of claim 1, wherein the memory controller is to:
   in response to a request to access the row of memory cells, retrieve responsive data from the cache without activating the row of memory cells in the memory module.

3. The memory controller of claim 1, wherein the memory address in the register of the memory module was added to the register by the memory module based on the memory module detecting the counter breaching the threshold.

4. The memory controller of claim 3, wherein the memory controller is to provide the memory address to an operating system (OS) memory manager for a reallocation of memory regions to mitigate the frequent activation of the row of memory cells.

5. The memory controller of claim 1, wherein the memory controller comprises a counter to track a quantity of accesses of the data of the row of memory cells in the cache.

6. The memory controller of claim 1, wherein the threshold is stored in a register of the memory module.

7. The memory controller of claim 6, wherein the memory controller is to program the threshold in the register of the memory module.

8. The memory controller of claim 1, wherein the cache is to store data of N rows of memory cells in the memory module, where N is greater than or equal to 1.

9. The memory controller of claim 1, wherein the cache comprises a first cache segment, and the communication channel is a first communication channel connected to a first set of memory devices in the memory module, wherein the first cache segment is to store data of a row of memory cells of any of the memory devices of the first set of memory devices, and wherein the interface couples the memory controller over a second communication channel to a second set of memory devices in the memory module, and the cache further comprises:

a second cache segment to store data of a row of memory cells of any of the memory devices in the second set of memory devices.

10. The memory controller of claim 9, wherein the memory controller is to:

receive a further alert based on a further counter in a further memory device of the second set of memory devices breaching the threshold, the further counter associated with a given row of memory cells in the memory module, and the further alert indicating a frequent activation of the given row of memory cells, and based on the further alert, store, in the second cache segment, data of the given row of memory cells.

11. The memory controller of claim 1, wherein the memory controller is to:

after storing the data of the row of memory cells in a cache line of the cache:

monitor a frequency of access of the data in the cache line; and based on the monitored frequency satisfying an inactivity threshold, invalidate the cache line containing the data of the row of memory cells.

12. The memory controller of claim 11, further comprising:

a row access counter to count a quantity of accesses of the data in the cache line, wherein the monitoring of the frequency of access is based on the count of the row access counter, wherein the row access counter is different from the counter in the memory module.

13. A memory device comprising:

a channel interface to a communication channel that is connected to a memory controller;

an array of memory cells;

a plurality of counters to track activations of respective rows of memory cells in the array of memory cells;

a register to store a memory address of a given row of the rows of memory cells responsive to a count of a given counter associated with the given row breaching a threshold, wherein the memory device is to, based on an access of the register by the memory controller, send, from the memory device to the memory controller over the communication channel, the memory address of the given row.

14. The memory device of claim 13, wherein the memory device is to send an alert to the memory controller responsive to the count of the given counter breaching the threshold.

15. The memory device of claim 14, wherein the register is accessible by the memory controller for the memory controller to determine the memory address of the given row of memory cells.

16. The memory device of claim 13, wherein the register is a first register, the memory device further comprising:

a second register to store the threshold.

17. The memory device of claim 16, wherein the threshold in the second register is adjustable by the memory controller.

18. A method of an electronic device, comprising:

detecting that a count of a counter in a memory module and associated with a row of memory cells in the memory module has breached a threshold;

based on the count of the counter breaching the threshold, issuing, by the memory module, an indication to a memory controller over a communication channel connecting the memory controller and the memory module, and storing, by the memory module in a register of the memory module, a row memory address of the row of memory cells;

retrieving, by the memory controller, the row memory address of the row of memory cells from the register over the communication channel;

retrieving, by the memory controller from the memory module, data of the row of memory cells identified by the row memory address from the register; and caching, by the memory controller, the retrieved data of the row of memory cells in a cache of the memory controller.

19. The method of claim 18, further comprising:

receiving, at the memory controller, a request for data in the row of memory cells;

retrieving, at the memory controller, the requested data from the cache; and sending, by the memory controller, the requested data retrieved from the cache to an entity that sent the request to the memory controller.

20. The method of claim 18, further comprising:

sending, by the memory controller, the row memory address to an operating system (OS) memory manager; and reallocating memory regions in the memory module based on the row memory address received from the memory controller.

\* \* \* \* \*